(12) United States Patent
Zhang (10) Patent No.: US 12,100,030 B2
(45) Date of Patent: Sep. 24, 2024

(54) METHOD AND APPARATUS FOR PRESENTING INFORMATION

(71) Applicants: Beijing Jingdong Shangke Information Technology Co., Ltd., Beijing (CN); Beijing Jingdong Century Trading Co., Ltd., Beijing (CN)

(72) Inventor: Zhen Zhang, Beijing (CN)

(73) Assignees: Beijing Jingdong Shangke Information Technology Co., Ltd., Beijing (CN); Beijing Jingdong Century Trading Co., Ltd., Beijing (CN)

( * ) Notice: Subject to any disclaimer, the term of this patent is extended or adjusted under 35 U.S.C. 154(b) by 656 days.

(21) Appl. No.: 17/285,805

(22) PCT Filed: Aug. 23, 2019

(86) PCT No.: PCT/CN2019/102124
§ 371 (c)(1),
(2) Date: Apr. 15, 2021

(87) PCT Pub. No.: WO2020/119170
PCT Pub. Date: Jun. 18, 2020

(65) Prior Publication Data
US 2021/0383153 A1     Dec. 9, 2021

(30) Foreign Application Priority Data
Dec. 14, 2018   (CN) .......................... 201811535399.8

(51) Int. Cl.
G06Q 30/0601    (2023.01)
G06F 18/21      (2023.01)
(Continued)

(52) U.S. Cl.
CPC ....... *G06Q 30/0601* (2013.01); *G06F 18/214* (2023.01); *G06F 18/2193* (2023.01);
(Continued)

(58) Field of Classification Search
None
See application file for complete search history.

(56) References Cited

U.S. PATENT DOCUMENTS

| 2014/0180864 A1 | 6/2014 | Orlov et al. |
| 2017/0236185 A1 | 8/2017 | Dalal et al. |
(Continued)

FOREIGN PATENT DOCUMENTS

| CN | 104951966 A | 9/2015 |
| CN | 106021603 A | 10/2016 |
(Continued)

OTHER PUBLICATIONS

X. Han, et al., "Learning Fashion Compatibility with Bidirectional LSTMs", ACM, 2017, 9 pgs.
(Continued)

*Primary Examiner* — Vincent Rudolph
*Assistant Examiner* — Raphael Schwartz
(74) *Attorney, Agent, or Firm* — BLANK ROME LLP (57) ABSTRACT

Disclosed in embodiments of the present application are an information presentation method and device. One specific embodiment of a system comprises: receiving a collocation request for performing clothing collocation on target clothing, the collocation request comprising a target clothing image; performing feature extraction on the target clothing image to obtain a feature vector of the target clothing image; and selecting, from a preset clothing information set on the basis of the feature vector of the target clothing image, a clothing image having a feature vector matching the feature vector of the target clothing image to form at least one group
(Continued)

of clothing collocation images together with the target clothing image, wherein the clothing information set comprises clothing images and feature vectors of the clothing images. The embodiment improves clothing collocation effects.

16 Claims, 5 Drawing Sheets

(51) Int. Cl.
*G06F 18/214* (2023.01)
*G06F 18/22* (2023.01)
*G06F 18/24* (2023.01)
*G06N 3/044* (2023.01)
*G06N 3/08* (2023.01)
*G06T 7/40* (2017.01)
*G06V 10/74* (2022.01)
*G06V 10/774* (2022.01)
*G06V 10/82* (2022.01)
*G06V 20/30* (2022.01)

(52) U.S. Cl.
CPC .............. *G06F 18/22* (2023.01); *G06F 18/24* (2023.01); *G06N 3/044* (2023.01); *G06N 3/08* (2013.01); *G06Q 30/0643* (2013.01); *G06T 7/40* (2013.01); *G06V 10/761* (2022.01); *G06V 10/774* (2022.01); *G06V 10/82* (2022.01); *G06V 20/30* (2022.01); *G06Q 30/0623* (2013.01); *G06T 2207/20084* (2013.01)

(56) References Cited

U.S. PATENT DOCUMENTS

2020/0104633 A1* 4/2020 Zheng ................ G06Q 30/0643
2021/0390607 A1* 12/2021 Jung ..................... G06Q 30/02

FOREIGN PATENT DOCUMENTS

| CN | 106156297 | A | 11/2016 |
| CN | 106803103 | A | 6/2017 |
| CN | 107665238 | A | 2/2018 |
| CN | 107679155 | A | 2/2018 |
| CN | 108230082 | A | 6/2018 |
| CN | 108734557 | A | 11/2018 |
| CN | 108920828 | A | 11/2018 |
| CN | 108932260 | A | 12/2018 |
| EP | 3328041 | A1 | 5/2018 |

OTHER PUBLICATIONS

Z. Yang, et al., "From Recommendation to Generation: A Novel Fashion Clothing Advising Framework", 2018 7th International Conference on Digital Home (ICDH), IEEE, 7 pgs.
Z. Zhou, et al., "Fashion Sensitive Clothing Recommendation Using Hierarchical Collocation Model", MM'18, Oct. 22-26, 2018, Seoul, Republic of Korea; Association for Computing Machinery, 9 pgs.
Extended European Search Report for EP19894762.4, dated Jul. 25, 2022, 8 pgs.
International Search Report for PCT/CN2019/102124, dated Nov. 28, 2019, 2 pages.
Chen et al, Dress Fashionably: Learn Fashion Collocation with Deep Mixed-Category Metric Learning, Thirty-second AAAI Conference on Artificial Intelligence (AAAI-18), Copyright 2018, pp. 2103-2110.

* cited by examiner

METHOD AND APPARATUS FOR PRESENTING INFORMATION

This application is a national stage of International Application No. PCT/CN2019/102124, filed on Aug. 23, 2019, which claims priority to Chinese Application No, 201811535399.8, filed on Dec. 14, 2018. The entire contents of which are hereby incorporated by reference.

TECHNICAL FIELD

Embodiments of the present disclosure relate to the field of computer technology, particularly to a method and apparatus for presenting information.

BACKGROUND

As information technology develops, Internet e-commerce gains widespread popularity. Users may purchase goods through such as shopping websites, or shopping applications without leaving their homes, which greatly improves the convenience of people's lives.

When a user purchases goods such as clothing through the Internet, the user wishes to observe clothing collocation effects. In related arts, a clothing collocation combination is usually preset. When the user requests a collocation effect image of a certain piece of clothing, the collocation effect image including the piece of clothing may be directly pushed to the user.

SUMMARY

Embodiments of the present disclose provide a method and apparatus for presenting information.

In a first aspect, some embodiments of the present disclosure provide a method for presenting information. The method includes: receiving a collocation request for performing clothing collocation on target clothing, where the collocation request includes an image of the target clothing; performing feature extraction on the image of the target clothing, to obtain a feature vector of the image of the target clothing; and selecting a clothing image from a preset clothing information set based on the feature vector of the image of the target clothing, the selected clothing image having a feature vector matching the feature vector of the image of the target clothing, to form at least one clothing collocation image group on the basis of the selected clothing image and the image of the target clothing, where the preset clothing information set includes clothing images and feature vectors of the clothing images.

In some embodiments, the preset clothing information set includes attribute information of clothing presented by the clothing images; and the selecting the clothing image from the preset clothing information set, the selected clothing image having a feature vector matching the feature vector of the image of the target clothing, includes: screening out, from the clothing information set, clothing images of clothing matching attribute information of the target clothing, wherein the attribute information includes at least one of: category information, style information, or texture information; and selecting, from the clothing images screened out, the clothing image having the feature vector matching the feature vector of the image of the target clothing.

In some embodiments, the attribute information of the target clothing is obtained performing attribute prediction on clothing presented by the image of the target clothing using a pre-trained attribute prediction model, wherein the attribute prediction model is obtained by training a convolutional neural network and at least one attention model based on training samples.

In some embodiments, the selecting the clothing image from the preset clothing information set, the selected clothing image having a feature vector matching the feature vector of the image of the target clothing, includes: for a clothing image in the preset clothing information set, inputting a feature vector of the clothing image and the feature vector of the image of the target clothing into a pre-trained matching degree model, to obtain a matching degree value between the clothing image and the image of the target clothing; and selecting a preset number of matching degree values from a set of matching degree values obtained by the pre-trained matching degree model according to a descending order of the set of matching degree values, and selecting clothing images corresponding to the preset number of matching degree values from the preset clothing information set.

In some embodiments, the matching degree model is obtained by training through: acquiring a training sample set, training samples in the training sample set including a random sample clothing image, a positive sample clothing image collocating with the random sample clothing image, and a negative sample clothing image not collocating with the random sample clothing image; and performing feature extraction on the sample clothing images using the convolutional neural network, to obtain feature vectors of the sample clothing images; for the training samples in the training sample set, performing following training operations: inputting a feature vector of the random sample clothing image, a feature vector of the positive sample clothing image, and a feature vector of the negative sample clothing image into a matching degree model to be trained, to obtain a feature value after fully connecting the feature vector of the random sample clothing image, the feature vector of the positive sample clothing image, and the feature vector of the negative sample clothing image; determining whether a loss value of a preset loss function reaches a preset threshold, wherein the preset loss function is used to indicate a difference between a difference value and the feature value in a feature value set obtained by the matching degree model, the difference value being between an Euclidean distance between the feature vector of the random sample clothing image and the feature vector of the positive sample clothing image and an Euclidean distance between the feature vector of the random sample clothing image and the feature vector of the negative sample clothing image in the training samples; determining that the training on the matching degree model is completed, in response to determining that the loss value of the preset loss function reaches the preset threshold; and adjusting a parameter of the matching degree model to continue performing the training operations, in response to determining that the loss value of the preset loss function does not reach the preset threshold.

In some embodiments, the method further includes: inputting the formed at least one clothing collocation image group into a pre-trained score prediction model, to obtain a prediction score of each of the at least one clothing collocation image group, wherein the score prediction model is obtained by training a long short term memory network and a classifier based on training samples; and selecting a preset number of clothing collocation image groups according to a descending order of prediction scores, so that to present the selected clothing collocation image groups on a client end.

In a second aspect, some embodiments of the present disclosure provides an apparatus for presenting information.

The apparatus includes: a receiving unit, configured to receive a collocation request for performing clothing collocation on target clothing, the collocation request including an image of the target clothing; a feature extraction unit, configured to perform feature extraction on the image of the target clothing, to obtain a feature vector of the image of the target clothing; and a selection unit, configured to select a clothing image from a preset clothing information set based on the feature vector of the image of the target clothing, the selected clothing image having a feature vector matching the feature vector of the image of the target clothing, to form at least one clothing collocation image group on the basis of the selected clothing image and the image of the target clothing, where the preset clothing information set includes clothing images and feature vectors of the clothing images.

In some embodiments, the preset clothing information set includes attribute information of clothing presented by the clothing images; and the selection unit is further configured to: screen out, from the clothing information se, clothing images of clothing matching attribute information of the target clothing, wherein the attribute information includes at least one of: category information, style information, or texture information; and select, from the clothing images screened out, the clothing image having the feature vector matching the feature vector of the image of the target clothing.

In some embodiments, the attribute information of the target clothing is obtained by performing attribute prediction on clothing presented by the image of the target clothing using a pre-trained attribute prediction model, wherein the attribute prediction model is obtained by, training a convolutional neural network and at least one attention model based on training samples.

In some embodiments, the selection unit is further configured to: for a clothing image in the preset clothing information set, input a feature vector of the clothing image and the feature vector of the image of the target clothing into a pre-trained matching degree model, to obtain a matching degree value between the clothing image and the image of the target clothing; and select a preset number of matching degree values from a set of matching degree values obtained by the pre-trained matching degree model according to a descending order of the set of matching degree values, and selecting clothing images corresponding to the preset number of matching degree values from the preset clothing information set.

In some embodiments, the matching degree model is obtained by training through: acquiring a training sample set, where training samples in the training sample set include a random sample clothing image, a positive sample clothing image collocating with the random sample clothing image, and a negative sample clothing image not collocating with the random sample clothing image; and performing feature extraction on the sample clothing images using the convolutional neural network, to obtain feature vectors of the sample clothing images; for the training samples in the training sample set, performing following training operations: inputting a feature vector of the random sample clothing image, a feature vector of the positive sample clothing image, and a feature vector of the negative sample clothing image into a matching degree model to be trained, to obtain a feature value obtained after fully connecting the feature vector of the random sample clothing image, the feature vector of the positive sample clothing image, and the feature vector of the negative sample clothing image; determining whether a loss value of a preset loss function reaches a preset threshold, wherein the preset loss function is used to indicate a difference between a difference value and the feature value in a feature value set obtained by the matching degree model, the difference value being between an Euclidean distance between the feature vector of the random sample clothing image and the feature vector of the positive sample clothing image and an Euclidean distance between the feature vector of the random sample clothing image and the feature vector of the negative sample clothing image in the training samples; determining that the training on the matching degree model is completed in response to determining that the loss value of the preset loss function reaches the preset threshold; and adjusting a parameter of the matching degree model to continue performing the training operations, in response to determining that the loss value of the preset loss function does not reach the preset threshold.

In some embodiments, the apparatus further includes a presentation unit, and the presentation unit is configured to: input the formed at least one clothing collocation image group into a pre-trained score prediction model, to obtain a prediction score of each of the at least one clothing collocation image group, wherein the score prediction model is obtained by training a long short term memory network and a classifier based on training samples; and select a preset number of clothing collocation image groups according to a descending order of prediction scores, so that to present the selected clothing collocation image groups on a client end.

In a third aspect, some embodiments of the present disclose provides an electronic device. The electronic device includes: one or more processors; and a storage apparatus, storing one or more programs thereon, the one or more programs, when executed by the one or more processors, cause the one or more processors to implement the method according to any one of embodiments in the first aspect.

In a fourth aspect, some embodiments of the present disclose provides a computer readable medium, storing a computer program thereon, the program, when executed by a processor, cause the processor to perform the method according to any one of embodiments in the first aspect.

The method and apparatus for presenting information provided in embodiments of the present disclosure, by comparing the feature vector obtained by performing feature extraction on the image of the target clothing with the feature vector of each clothing image in the clothing information set, the clothing images having the matching degree between the feature vector of the clothing image and the feature vector of the image of the target clothing greater than the preset threshold are selected, forming at least one clothing collocation image group on the basis of selected clothing images and the image of the target clothing, so that clothing matching the feature of the target clothing may be selected and collocated with the target clothing, which improves clothing collocation effects.

BRIEF DESCRIPTION OF THE DRAWINGS

By reading the detailed description of non-limiting embodiments with reference to the following accompanying drawings, other features, objectives and advantages of the present disclosure will become more apparent.

DETAILED DESCRIPTION OF EMBODIMENTS

Embodiments of present disclosure will be described below in detail with reference to the accompanying drawings. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the some embodiments in the present disclosure and some features in the disclosure may be combined with each other on a non-conflict basis. Features of the present disclosure will be described below in detail with reference to the accompanying drawings and in combination with embodiments.

Figure 1:
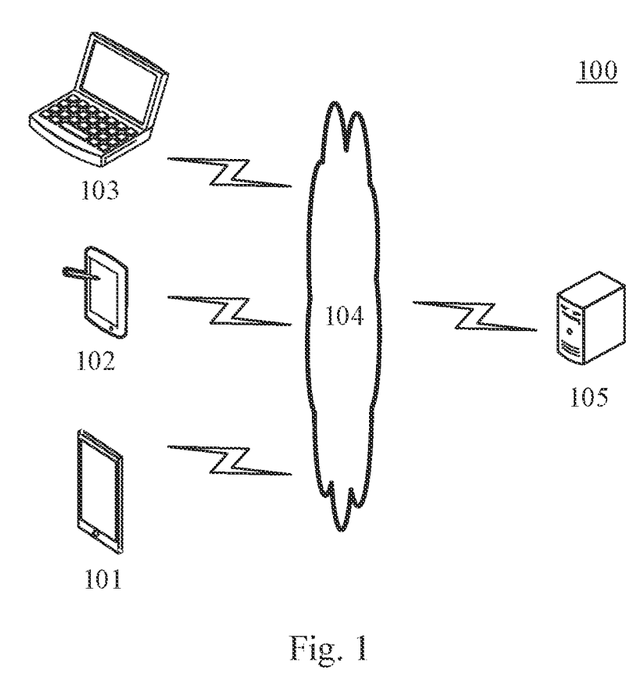
FIG. 1 is an example system architecture diagram in which embodiments of the present disclosure may be implemented.

FIG. 1 shows an example system architecture 100 in which embodiments of a method for presenting information or an apparatus for presenting information may be applied.

As shown in FIG. 1, the system architecture 100 may include terminal devices 101, 102, 103, a network 104, and a server 105. The network 104 is used to provide a communication link medium between the terminal devices 101, 102, 103 and the server 105. The network 104 may include various types of connections, such as wired, wireless communication links, or optic fibers.

A user may interact with the server 105 through the network 104 using the terminal device 101, 102 or 103 to receive or send messages and the like. Various communication client applications may be installed on the terminal devices 101, 102, 103, such as web browser applications, shopping applications, search applications, instant messaging tools, email clients, and/or social platform software.

The terminal devices 101, 102, 103 may be hardware or software. When the terminal devices 101, 102, 103 are hardware, they may be various electronic devices having a display screen and supporting data input, including but not limited to smart phones, tablet computers, laptop portable computers, desktop computers, or the like. When the terminal devices 101, 102, 103 are software, they may be installed in the electronic devices listed above. They may be implemented as a plurality of software or software modules, or as a single software or software module, which is not limited herein.

The server 105 may be a server that provides various services, such as a backend server that provides support for shopping applications, webpage display applications, clothing collocation applications, etc. installed on the terminal devices 101, 102, 103. The backend server may analyze and process a received image of a piece of target clothing, and feed back a processing result (for example, a generated clothing collocation image) to the terminal device(s).

It should be noted that the method for presenting information provided by embodiments of the present disclosure is generally performed by the server 105, and accordingly, the apparatus for presenting information is generally provided in the server 105.

It should be noted that the server 105 may be hardware or software. When the server 105 is hardware, it may be implemented as a distributed server cluster composed of a plurality of servers, or as a single server. When the server is software, it may be implemented as a plurality of software or software modules, or as a single software or software module, which is not limited herein.

It should be understood that the number of terminal devices, networks, and servers in FIG. 1 is merely illustrative. Depending on the implementation needs, there may be any number of terminal devices, networks, and servers.

Figure 2:
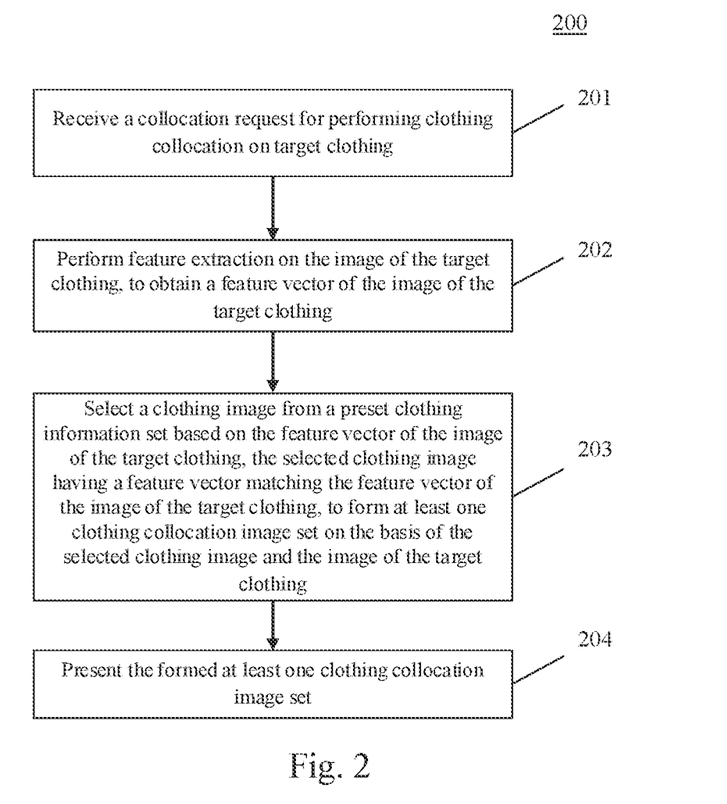
FIG. 2 is a flowchart of a method for presenting information according to an embodiment of the present disclosure.

With further reference to FIG. 2, a flow 200 of a method for presenting information according to an embodiment of the present disclosure is illustrated. The method for presenting information includes the following steps:

Step 201, receiving a collocation request for performing clothing collocation on target clothing.

In the present embodiment, the executing body (for example, the server shown in FIG. 1) of the method for presenting information may receive the collocation request for performing clothing collocation on the target clothing sent by a terminal through a wired connection or a wireless connection. The collocation request may include an image of the target clothing. The terminal used by a user is usually installed with an application such as a clothing collocation application and/or a shopping application that is supported by the executing body. When purchasing clothing goods using the shopping application installed on the terminal, the user usually desires to observe effect of the collocation between a piece of clothing with other clothes. Since the user may only see clothing images through the terminal, an image corresponding to the piece of clothing the user wants to purchase may be used as the image of the target clothing for requesting the clothing collocation. The user may also send a locally saved image of the target clothing to the executing body thorough a clothing allocation application installed on the terminal, so as to request the executing body to acquire clothing images of the clothing that may be collocated with the clothing presented by the image of the target clothing.

In the present embodiment, the clothing may include clothes and accessories. Clothes may include but are not limited to tops, bottoms, and shoes. Tops include but are not limited to coats, shirts, T-shirts, sweaters, and fleeces. Bottoms include but are not limited to pants and skirts. Accessories include but are not limited to hair accessories, sunglasses, scarves, brooches, ear studs, earrings, necklaces, bracelets, wristbands and watches. The aforementioned clothing collocation may include collocation among tops, bottoms, shoes and accessories. For example, collocation among coats, shirts, pants, shoes, scarves and headwear.

Step 202, performing feature extraction on the image of the target clothing, to obtain a feature vector of the image of the target clothing.

In the present embodiment, the executing body may perform feature extraction on the image of the target clothing. The image of the target clothing may be input into a neural network which is used for feature extraction, so that the feature vector of the image of the target clothing may be obtained. The neural network used for feature extraction is pre-trained based on sample clothing images, and the neural network may include a convolutional layer, a pooling layer, and an embedding layer. The convolutional layer and the pooling layer are used to perform feature extraction on clothing images to obtain feature maps of the clothing images and the embedding layer is used to convert the feature maps into fixed-length feature vectors.

Step 203, selecting a clothing image from a preset clothing information set based on the feature vector of the image of the target clothing, the selected clothing image having a feature vector matching the feature vector of the image of the target clothing, to form at least one clothing collocation image group on the basis of the selected clothing image and the image of the target clothing.

In the present embodiment, a clothing information set may be preset in the executing body. The clothing information set may include clothing information of various categories of clothing. The clothing information includes clothing imagoes, feature vectors of the clothing images, and attribute information such as material, color, or category of the clothing presented by the clothing images. The feature vectors of the clothing images included in the clothing information set may be obtained after the pre-trained neural network used for feature extraction performs feature extraction.

In the present embodiment, the feature vector of the clothing image may include a feature component for representing color, a feature component for representing design, a feature component for representing category, a feature component for representing texture, and/or the like.

In the present embodiment, in the feature component for representing category, the same category may be represented by the same feature component. After obtaining the feature vector of the image of the target clothing, the executing body may first screen out, from the clothing information set, a clothing image having the same feature component as a feature component representing category in the image of the target clothing. When calculating a matching degree, the clothing image screened out does not participate in the matching degree calculation, so that clothing of the same clothing category as that presented by the image of the target clothing may be excluded, avoiding unnecessary clothing collocation and improving collocation efficiency. For example, when the clothing presented by the image of the image of the target clothing is coats, then bottoms images, shoes images, accessory images, etc. may be selected from the clothing information set for matching degree calculation.

The executing body may calculate a matching degree between the feature vector of the target clothing obtained in step 202 and the feature vector of each clothing image in the clothing information set (for example, calculating a Mahalanobis distance between the vectors), so that a clothing image having a matching degree greater than a preset threshold may be selected from the clothing information set. When calculating the matching degree, a matching degree value between feature components may be calculated separately, and then a weighted summation may be performed on the matching degree values of the respective feature components.

In the present embodiment, when calculating the matching degree value based on the feature component for representing color, a color matching table may be preset, in which matching degree values between colors are set. The greater the matching degree value between two colors, the easier it is to collocate the two colors. The executing body may refer to the color matching table to determine a matching degree value between the feature component for representing color in the feature vector of the image of the target clothing and the feature component for representing color in the feature vector of a clothing image in the clothing information set.

In the present embodiment, when calculating the matching degree value based on the feature component for representing style, the executing body may determine a matching degree value between the feature component for representing style in the feature vector of the image of the target clothing and the feature component for representing style in the feature vector of a clothing image in the clothing information set. For example, a matching degree value between two pieces of clothing of the same style may be set to 1 (for example, both belonging to a sports style, a tooling style, or a suit style), a matching degree value between two pieces of clothing that may be collocated with each other but belong to different styles may be set to 0.7 (for example, a suit style and a sports style), and a matching degree value between two pieces of clothing of different styles but cannot be collocated together may be set to 0.

In the present embodiment, after selecting the images matching the image of the target clothing from the clothing information set, the executing body may form the at least one clothing collocation image group on the basis of selected images and the image of the target clothing. The selected clothing images may be arranged and combined, to obtain a plurality of collocation image groups. Then, the image of the target clothing is added to each collocation image group.

When arranging and combining the selected clothing images, for each clothing collocation image group in the at least one clothing collocation image group, clothing presented in the clothing collocation image group belong to different categories.

In some alternative implementations of the present embodiment, the selecting, from a preset clothing information set, a clothing image having a feature vector matching the feature vector of the image of the target clothing, further includes: screening out, from the clothing information set, clothing images of clothing matching the attribute information of the target clothing, where the attribute information includes at least one of: category information, style information, or texture information; then, selecting, from the clothing images screened out, the clothing image having the feature vector matching the feature vector of the image of the target clothing. The executing body may pre-store an attribute collocation table. The attribute collocation table may store collocations between textures and collocations between styles, and the collocations between textures may include collocations between colors, collocations between patterns, and collocations between materials. The executing body may select, based on the attribute collocation table, a clothing image of a piece of clothing that may be collocated with the style of the target clothing; or may also select, based on the category of the target clothing, a clothing image of a piece of clothing that can form a group with the target clothing; or may also select a clothing image of a piece of clothing that may be collocated with a color of the target clothing, or the like.

In some alternative implementations of the present embodiment, the selecting the clothing image from the preset clothing information set, the selected clothing image having a feature vector matching the feature vector of the image of the target clothing, further includes: for a clothing image in the preset clothing information set, inputting the feature vector of the clothing image and the feature vector of the image of the target clothing into a pre-trained matching degree model, to obtain a matching degree value between the clothing image and the image of the target clothing; and selecting a preset number of matching degree values from a set of matching degree values obtained by the pre-trained matching degree model according to a descending order of the set of matching degree values, and selecting clothing images corresponding to the preset number of matching degree values from the preset clothing information set. The matching degree model is used to represent a matching degree value between two feature vectors.

Step 204, presenting the formed at least one clothing collocation image group.

In the present embodiment, based on the at least one clothing collocation image group formed in step 203, the executing body may present the formed at least one clothing collocation image group on the terminal which issues the clothing collocation request. The at least one clothing collocation image group may be one clothing collocation image group or a plurality of clothing collocation image groups.

Figure 3:
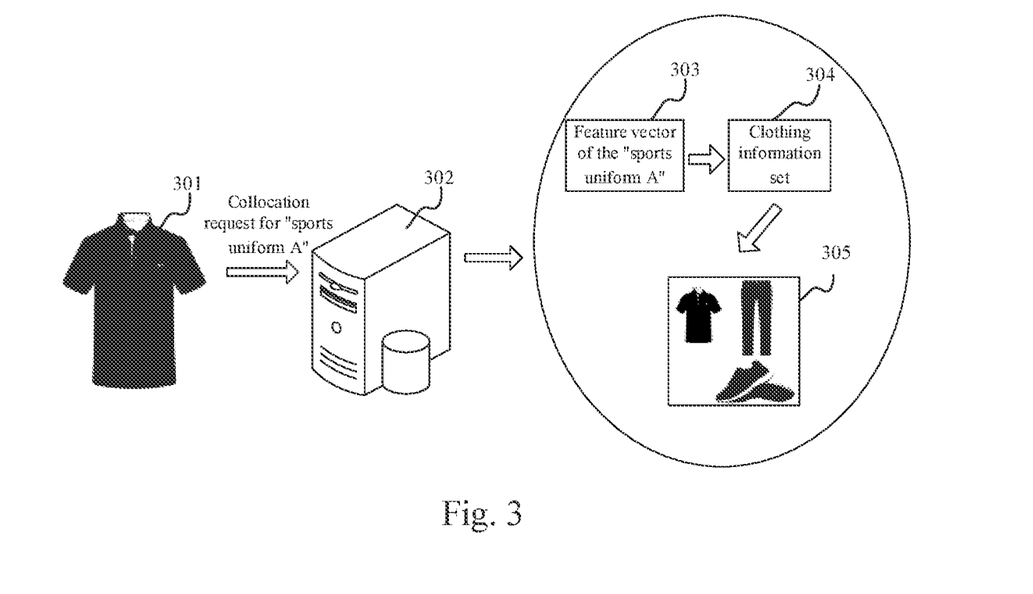
FIG. 3 is a schematic diagram of an application scenario of the method for presenting information according to an embodiment of the present disclosure.

With further reference to FIG. 3, FIG. 3 is a schematic diagram of an application scenario of the method for presenting information according to an embodiment of the present embodiment. In the application scenario of FIG. 3, a user sends a clothing collocation request for "sports uniform A" to a server 302 through a terminal, and the collocation request includes an image 301 of "sports uniform A". Then, the server 302 may perform feature extraction on the image of "sports uniform A" to obtain a feature vector 303 of the image 301 of "sports uniform A". Next, the server 302 may compare the feature vector 303 of the image 301 of "sports uniform A" with a feature vector of each clothing image in a preset clothing information set 304, and select a clothing image having a feature vector matching the feature vector 303 of the image 301 of "sports uniform A" from the clothing image set 304, thereby forming a clothing collocation image 305 on the basis of the selected clothing image and the image 301 of "sports uniform A". Finally, the clothing collocation image 305 may be presented through the terminal that sends the request.

The method for presenting information provided in an embodiment of the present disclosure, by comparing the feature vector obtained by performing feature extraction on the image of the target clothing with the feature vector of each clothing image in the clothing information set, the clothing images having the matching degree between the feature vector of the clothing image and the feature vector of the image of the target clothing greater than the preset threshold are selected, forming at least one clothing collocation image group on the basis of selected clothing images and the image of the target clothing, and finally presenting the formed at least one clothing collocation image group, so that clothing matching the feature of the target clothing may be selected and collocated with the target clothing, which improves clothing collocation effects.

Figure 4:
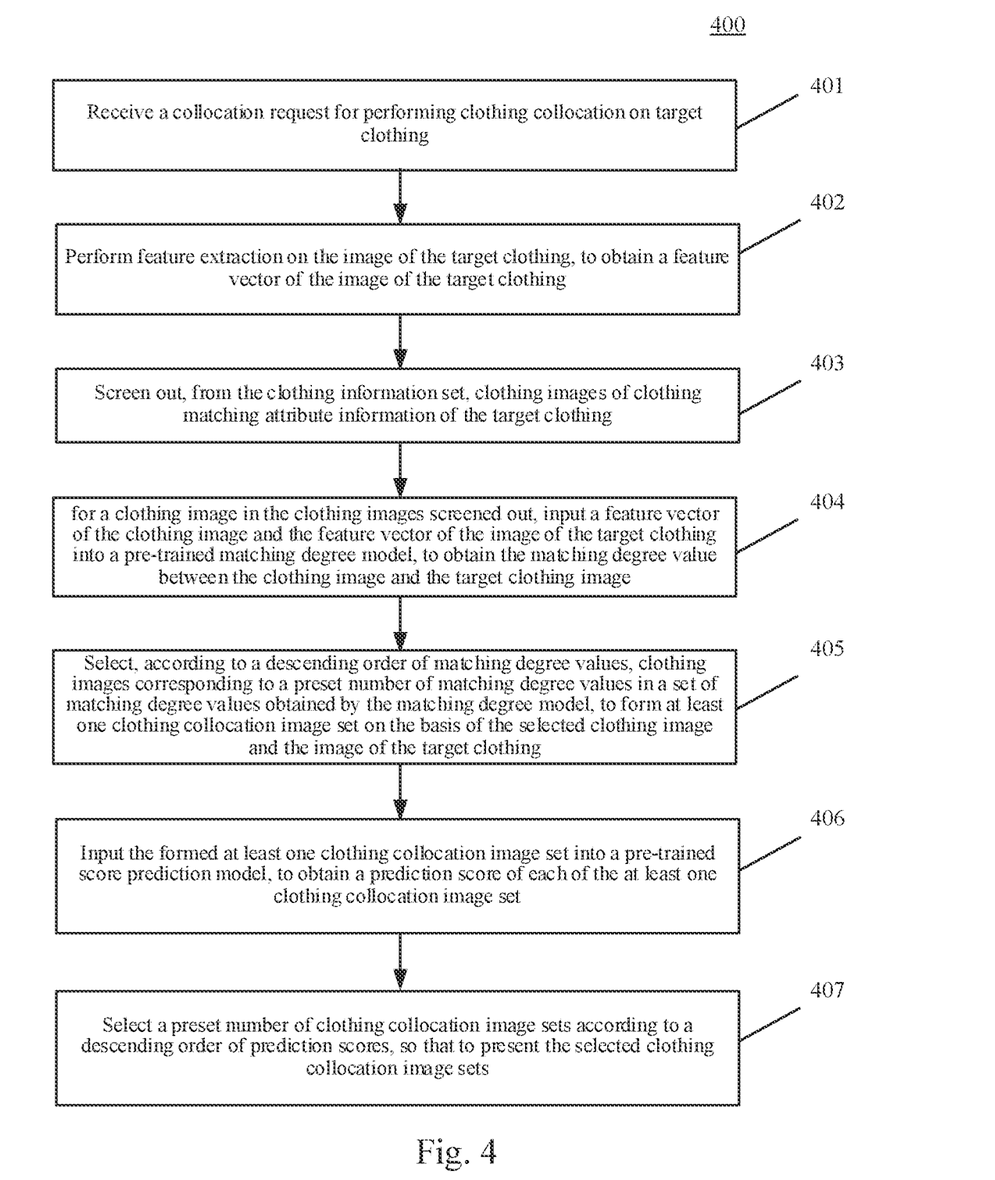
FIG. 4 is a flowchart of a method for presenting information according to another embodiment of the present disclosure.

With further reference to FIG. 4, a flow 400 of a method for presenting information according to another embodiment of the present disclosure is illustrated. The method for presenting information includes the following steps:

Step 401, receiving a collocation request for performing clothing collocation on target clothing.

In the present embodiment, an executing body (for example, the server shown in FIG. 1) of the method for presenting information may receive the collocation request for performing clothing collocation on the target clothing sent by a terminal through a wired connection or a wireless connection. The collocation request may include an image of the target clothing.

Step 402, performing feature extraction on the image of the target clothing, to obtain a feature vector of the image of the target clothing.

For a processing method and implementation of step 401 and step 402 shown in the present embodiment, reference may be made to the related operations of step 201 and step 202 in the embodiment shown in FIG. 2, and detailed description thereof will be omitted.

Step 403, selecting clothing images of pieces of clothing matching the attribute information of the target clothing from the clothing information set.

In the present embodiment, the executing body may also perform image recognition on the image of the target clothing, to obtain the attribute information of the target clothing presented by the image of the target clothing. The attribute information may include texture information, category information, style information, and/or season information in which the piece of clothing suitable wearing. The texture information may include color, material, pattern, and so on. The category information is used to represent a category of the target clothing. The category may include tops, bottoms, shoes, hair accessories, etc. The category of tops may include shirts, fleeces, coats, sweaters, T-shirts, etc. The category of bottoms may include pants, skirts, etc. The style information is used to represent a style of the target clothing, and the style may include, for example, a sports style, a cowboy style, a casual style, a business style, and so on.

A clothing information set may be preset in the executing body. The clothing information set may include clothing information of clothing of various categories. The clothing information includes clothing images, and attribute information of clothing presented by the clothing images. The attribute information may include texture information, category information, style information, season information in which the piece of clothing suitable wearing, etc.

Then, the executing body may compare the attribute information of the target clothing with the attribute information of the clothing presented by the clothing images included in the clothing information set, so that the clothing images of the clothing matching the attribute information of the target clothing may be screened out. The executing body may prestore an attribute collocation table. The attribute collocation table may store collocations between textures and collocations between styles, and the collocations between textures may include collocations between colors, collocations between patterns, collocations between materials. The executing body may select, based on the attribute collocation table, a clothing image of a piece of clothing that may be collocated with the style of the target clothing; or may also select, based on the category of the target clothing, a clothing image of a piece of clothing that can form a group with the target clothing; or may also select a clothing image of a piece of clothing that may be collocated with a color of the target clothing, or the like.

In some alternative implementations, the attribute information of the target clothing is obtained by performing attribute prediction on the image of the target clothing by using a pre-trained attribute prediction model. The attribute prediction model is obtained by training a convolutional neural network and at least one attention model based on training samples.

When the attribute information includes any one of category, style, or texture, the number of the attention model may be one. When the attribute information includes category, style, and texture at the same time, the number of the attention model may be three. The attention model is a model that introduces a weight mechanism based on different attention points of the acquired information by using the convolutional neural network as a framework. The attention model may introduce a weight function at an input end. The weight function may, based on different information that needs to be recognized, set a higher weight for a feature map that may be used to recognize to-be-recognized information, and set lower weights for the remaining feature maps or set the weights of the remaining feature maps to 0. For example, when the attention model is used to recognize a category of a clothing image, when feature maps corresponding to the clothing image are input into the attention model, the feature map used to represent a contour feature may be set a higher weight, and feature maps used to represent other features may be set lower weights; when the attention model is used to recognize the style of the clothing image, the feature map used to represent feature information of the clothing, such as collar feature or color feature, may be set higher weights, and feature maps of other features may be set lower weights; and when the attention model is used to recognize the texture of the clothing image, a feature map used to locally represent a texture feature may be set a higher weight, and feature maps used to represent other features may be set lower weights.

An attribute prediction model including a convolutional neural network and three attention models is used as an example to illustrate in detail.

First, a training sample set may be acquired. The training sample set includes sample clothing images and label information of the sample clothing images. The label information includes category information, style information, and texture information corresponding to the sample clothing images.

Then, performing first training operations: inputting a sample clothing image in the training sample set into the convolutional neural network, to obtain sample feature maps corresponding to the sample clothing image; determining whether a size and number of the sample feature maps reach preset values; in response to determining that the size and number of the sample feature maps reach the preset values, determining that the training on the convolutional neural network is completed; and in response to determining that the size and number of the sample feature maps do not reach the preset values, adjusting parameters such as a convolution kernel size, the number of convolution kernels, or the number of convolution layers in the convolutional neural network, and continue performing the first training operations.

Performing second training operations: inputting the feature maps corresponding to the sample clothing image and output by the trained convolutional neural network respectively into a first attention model to be trained, to obtain category information of sample clothing presented by the sample clothing image. The first attention model is used to represent corresponding relationships between the feature maps and the category information. The obtained category information includes a probability value corresponding to each category information in a preset category so. Then, in the set of probability values corresponding to the sample clothing image, determining whether category information corresponding to the maximum probability value is the category information labeled for the sample clothing image. If yes, determining that the training on the first attention model is completed. If not, adjusting parameters of the first attention model and continue performing the second training operations.

Performing third training operations: inputting the feature maps corresponding to the sample clothing image and output by the trained convolutional neural network into a second attention model to be trained, to obtain style information of the sample clothing presented by the sample clothing image. The second attention model is used to represent corresponding relationships between the feature maps and the style information. The style information includes a probability value corresponding to each style information in a preset style set. Then, in the set of style probability values corresponding to the sample clothing image, determining whether style information corresponding to the maximum style probability value is the style information labeled for the sample clothing image. If yes, determining that the training on the second attention model is completed. If not, adjusting parameters of the second attention model and continue performing the third training operations.

Performing fourth training operations: inputting the feature maps corresponding to the sample clothing image and output by the trained convolutional neural network into a third attention model to be trained, to obtain texture information of the sample clothing presented by the sample clothing image. The third attention model is used to represent corresponding relationships between the feature maps and the texture information. The texture information includes a probability value corresponding to each texture information in a preset texture set, where the texture information also includes cloth information and color information of the clothing. Then, in a set of texture probability values corresponding to the sample clothing image, determining whether the texture information corresponding to a maximum probability value is the texture information labeled for the sample clothing image. If yes, determining that the training on the third attention model is completed. If not, adjusting parameters of the third attention model and continue performing the fourth training operations.

It should be noted herein that since the first attention model, the second attention model, and the third attention model are independent of each other, there is no dependency relationship therebetween. Therefore, after the first training operations are completed, the second training operations, the third training operations, and the fourth training operations may be performed simultaneously or separately.

In some alternative implementations, the attribute information of the clothing presented by the clothing images included in the preset information set may also be obtained by performing attribute prediction on the clothing images using the pre-trained attribute prediction model.

By using the pre-trained attribute prediction model, the accuracy of the determined attributes of the clothing presented by the clothing images may be improved, so that the selected clothing images are more accurate, and a collocation speed of collocating on the target clothing may be improved, which is conducive to improving clothing collocation effects.

Step 404, for a clothing image in the clothing images screened out, inputting a feature vector of the clothing image and the feature vector of the image of the target clothing into a pre-trained matching degree model, to obtain a matching degree value between the clothing image and the image of the target clothing.

In the present embodiment, the clothing information set also includes the feature vectors of the clothing images. The feature vectors of the clothing images may be obtained by performing feature extraction using a pre-trained neural network for feature extraction. The feature vector of the clothing image may include a feature component for representing color, a feature component for representing design, a feature component for representing category, a feature component for representing texture, and/or the like.

Then, the executing body may input the feature vector corresponding to each screened out clothing image and the feature vector corresponding to the image of the target clothing into the pre-trained matching degree model, so as to obtain the matching degree value between the clothing image and the image of the target clothing. The matching degree model is used to represent the matching degree value between the feature vector of the clothing image and the feature vector of the image of the target clothing. In the present embodiment, the matching degree model may be a Euclidean distance determination function, and the fixed parameter in the Euclidean distance determination function is predetermined based on training samples. The Euclidean distance determination function is used to determine the matching degree value through a distance between the feature vector of the image of the target clothing and the feature vector of the selected clothing image. The greater the Euclidean distance, the smaller the matching degree value, the smaller the Euclidean distance, the greater the matching degree value.

Step 405, selecting a preset number of matching degree values from a set of matching degree values obtained by the pre-trained matching degree model according to a descending order of the set of matching degree values, and selecting clothing images corresponding to the preset number of matching degree values from the preset clothing information set to form the at least one clothing image collation set together with the image of the target clothing.

In the present embodiment, based on the matching degree values between the feature vectors corresponding to the selected clothing images and the feature vector corresponding to the image of the target clothing determined in step 404, the executing body may select, according to the descending order of the matching degree values, the preset number of matching degree values from the obtained matching degree value set, and select, from the clothing images screened out, the clothing images corresponding to the preset number of matching degree values from the clothing information set to form the at least one clothing collocation image group together with the image of the target clothing.

Step 406, inputting the formed clothing collocation images into a pre-trained score prediction model, to obtain a prediction score of each clothing collocation image group.

In the present embodiment, the executing body may input the formed clothing collocation images into the pre-trained score prediction model to obtain the prediction score of each clothing collocation image group. Here, the score prediction model is obtained by training a long short term memory network (LSTM) and a classifier based on training samples. The classifier may include a logistic regression classifier and a softmax classifier. The long short term memory neural network is an improvement in circulating networks, and usually includes a number of interconnected memory neurons. Each memory neuron may receive information input by a previous memory neuron that carries all or part of features of other neurons, and then process the information to realize memorizing the features. Typically, LSTM may be set with a time step, and each time step is a processing period. The time step may be set based on the number of clothing images included in each clothing collocation image group. For example, when each clothing collocation image group includes 5 clothing images, the time step is time length for processing the 5 clothing images.

For each clothing collocation image group in the formed clothing collocation image groups, the clothing collocation images in the clothing collocation image group are sequentially input into a pre-trained LSTM model, Here, when a first clothing image is input into LSTM, LSTM performs feature extraction on the image, to obtain a feature value of the first clothing image; then, LSTM receives a second clothing image, superimposes the above obtained feature value onto the received second clothing image, and performs feature extraction on the superimposed information; sequentially repeating the above operations until all of the images in the clothing collocation image group are processed, to obtain a first output feature value. LSTM may also perform inverse propagation, that is, using the clothing image last input into LSTM as the first clothing image, perform feature extraction on the clothing image to obtain a feature value after feature extraction, then superimpose the feature value to a clothing image input into LSTM at the previous moment, and perform feature extraction on the superimposed information; sequentially repeating the above operations until all of the images in the clothing collocation image group are processed, to obtain a second output feature value. The first output feature value and the second output feature value are then fully connected. Finally, full-connected data are input into the classifier to obtain the prediction score of the clothing collocation image group.

The present embodiment performs feature extraction on each clothing collocation image group by using a two-way propagation LSTM, and thus the processing speed is speed up, and the accuracy of the model is improved, so that the feature data input into the classifier are more accurate, so that the accuracy of the score predicted by the classifier may be further improved.

The score prediction model may be obtained by training through the following operations:

first, acquiring a training sample set, where the training sample set includes a plurality of sample clothing collocation image groups, the plurality of sample clothing collocation image groups include manually specified positive samples that capable of forming clothing collocation image groups, also include negative samples such as a clothing collocation image group randomly formed. The manually labeled values of the positive samples are 1, and the manually labeled values of the negative samples are 0.

Then, performing following training operations: for each training sample group in the training sample set, inputting clothing images in the training sample group into a LSTM to be trained, to obtain a feature value after LSTM processing, and then inputting the feature value into a SoftMax classifier to be trained to obtain a sample prediction value through the SoftMax classifier.

Determining whether a loss value of a preset loss function reaches a preset threshold, determining that the training of the score prediction model is completed, in response to determining that the loss value of the preset loss function reaches the preset threshold. The preset loss function is used to represent a difference between a sample prediction value in a sample prediction value set and a manually labeled value of the corresponding clothing collocation images. The preset loss function may be, for example, a mutual entropy loss function, a square loss function, or the like.

Adjusting a parameter of the LSTM and the softmax classifier to continue performing the above training operations using the training sample set, in response to determining that the loss value of the preset loss function does not reach the preset threshold.

Step 407, selecting a preset number of clothing collocation image groups according to a descending order of the prediction scores, and presenting the selected clothing collocation images.

In the present embodiment, after determining the prediction score of each clothing collocation image group in the formed clothing collocation images, the executing body may select a preset number of clothing collocation image groups according to the descending order of the prediction scores, and then present the formed at least one clothing collocation image groups through the terminal which requests to acquire the clothing collocation request.

It can be seen from FIG. 4 that, unlike the embodiment shown in FIG. 2, the present embodiment highlights the step of selecting, from the clothing information set, the clothing images of clothing which has the same attributes as that of the target clothing, thereby reducing the number of clothing images participating in feature matching, and improving the speed of determining the clothing presented by the clothing images that may be collocated with the target clothing. The present embodiment further highlights the step of predicting the score of the formed clothing collocation images, and selecting at least one clothing collocation image groups having high prediction score, so as to further improve collocation effects.

Figure 5:
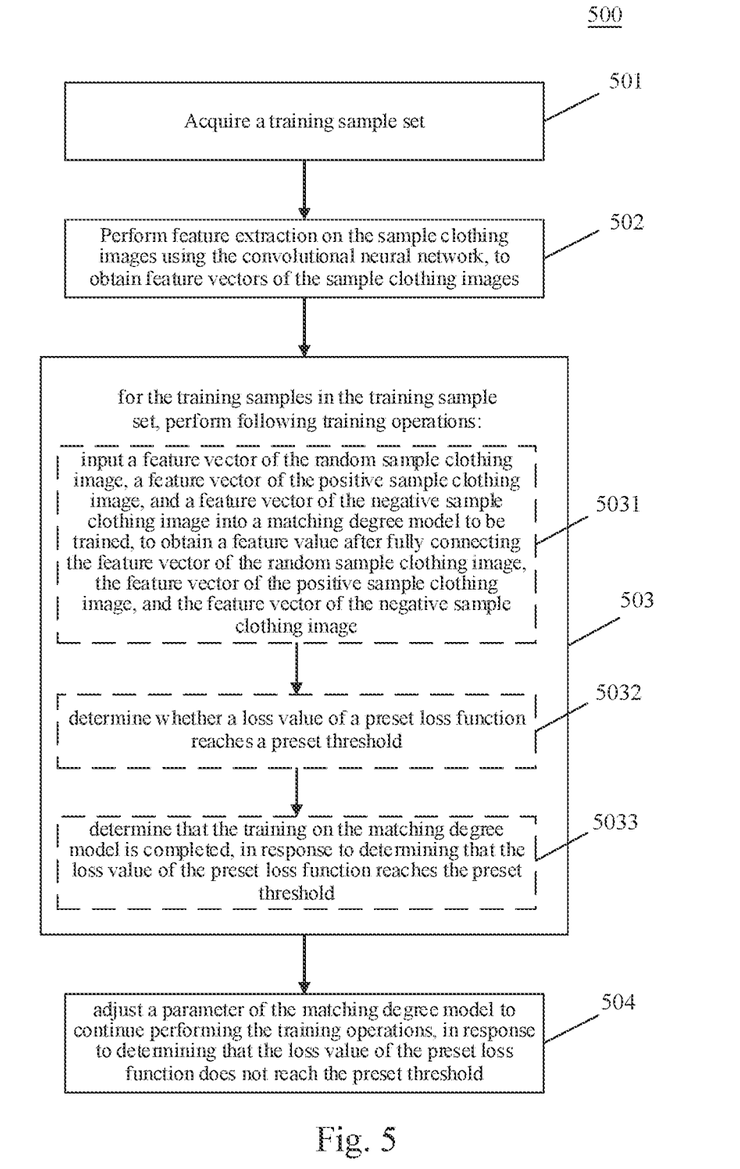
FIG. 5 shows a flowchart of an alternative implementation of a method for training a matching degree model.

In some alternative implementations of the above embodiment, the matching degree model may be obtained by training based on a sample set. FIG. 5 shows a flow 500 of an alternative implementation of a method for training the matching degree model. The flow 500 includes the following steps:

Step 501, acquiring a training sample set, training samples in the training sample set including a random sample clothing image, a positive sample clothing image that can be collocated with the random sample clothing image, and a negative sample clothing image that cannot be collocated with the random sample clothing image.

Step 502, performing feature extraction on a sample clothing image using the convolutional neural network, to obtain feature vectors of the sample clothing images. The convolutional neural network is pre-trained and used for image feature extraction.

Step 503, for each training sample in the training sample set, performing training steps as follows:

first, in step 5031, inputting a feature vector of the random sample clothing image, a feature vector of the positive sample clothing image, and a feature vector of the negative sample clothing image into a matching degree model to be trained, to obtain a feature value after performing full connection on the feature vector of the random sample clothing image, the feature vector of the positive sample clothing image, and the feature vector of the negative sample clothing image. The matching degree model to be trained may be formed by neural networks. The neural networks include a fully connected layer, which is used to perform a fully connecting operation on the feature vector of the random sample clothing image, the feature vector of the positive sample clothing image, and the feature vector of the negative sample clothing image, so that the feature value based on the training sample may be output.

Then, in step 5032, determining whether a loss value of a preset loss function reaches a preset threshold. Here, the preset loss function is used to indicate a difference between a difference value and the feature value in a feature value set obtained by the matching degree model, the difference value being between an Euclidean distance between the feature vector of the random sample clothing image and the feature vector of the positive sample clothing image and an Euclidean distance between the feature vector of the random sample clothing image and the feature vector of the negative sample clothing image in the training samples. The preset loss function may be a triplet loss function. The loss function is: the Euclidean distance between the feature vector of the random sample clothing image and the feature vector of the positive sample clothing image in the training samples, minus the Euclidean distance between the feature vector of the random sample clothing image and the feature vector of the negative sample clothing image, plus a preset constant. In the training process, a back propagation algorithm and a gradient descent algorithm may be used to iteratively adjust parameters of the matching degree model to be trained, so that the loss value of the preset loss function gradually converges. The adjusting parameters of the matching degree model to be trained may be, for example, adjusting a weight of the feature vector of each sample clothing image when performing fully connection, the number of feature components corresponding to the feature vector, and the like. When the loss value of the preset loss function converges to a preset threshold, it may be determined that the training of the matching degree model is completed.

Finally, in step 5033, determining that the training of the matching degree model is completed, in response to determining that the loss value of the preset loss function reaches the preset threshold.

In some alternative implementations, the method also includes: step 504, adjusting a parameter of the matching degree model to be trained, to continue performing the training steps, in response to determining that the loss value of the preset loss function does not reach the preset threshold. Typically, when the gradient descent algorithm is used to train the matching degree model, when the loss value of the preset loss function converges to a certain value, the loss value of the loss function no longer decreases. However, when the loss value of the loss function does not reach the preset threshold, the parameter of the matching degree model to be trained needs to be adjusted. Here, the adjusting a parameter of the matching degree model to be trained may include, for example, adjusting the value of the preset constant in the loss function, adjusting such as the number of convolution kernels or a convolution kernel size of the neural networks for training the matching degree model.

The matching degree model obtained based on the training steps of the matching degree model provided in FIG. 5 inputs three sample clothing images as one group into the matching degree model, so that the matching degree model learns the difference between the random sample and the positive sample, and the difference between the random sample and the negative sample. As a result, the Euclidean distance between the random sample and the positive sample is getting smaller and smaller, and the Euclidean distance between the random sample and the negative sample is getting greater and greater. Therefore, it is possible to more accurately select, from a clothing image set, the clothing images of the clothing that can be collocated with the target clothing, thereby helping to improve clothing collocation effects.

Figure 6:
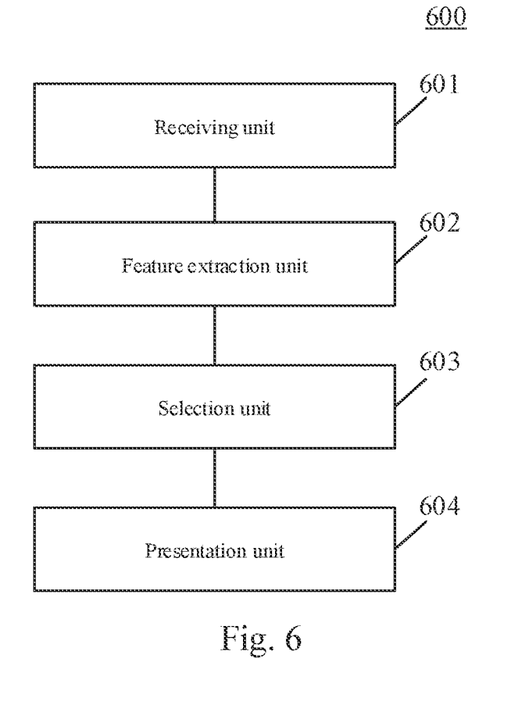
FIG. 6 is a schematic structural diagram of an apparatus for presenting information according to an embodiment of the present disclosure.

With further reference to FIG. 6, as an implementation of the method shown in FIG. 2, an embodiment of the present disclosure provides an apparatus for presenting information, and the apparatus embodiment corresponds to the method embodiment as shown in FIG. 2. The apparatus may be applied to various electronic devices.

As shown in FIG. 6, an apparatus 600 for presenting information of the present embodiment includes: a receiving unit 601, a feature extraction unit 602, a selection unit 603 and a presentation unit 604. The receiving unit 601 is configured to receive a collocation request for performing clothing collocation on target clothing, where the collocation request includes an image of the target clothing. The feature extraction unit 602 is configured to perform feature extraction on the image of the target clothing, to obtain a feature vector of the image of the target clothing. The selection unit 603 is configured to select a clothing image from a preset clothing information set based on the feature vector of the image of the target clothing, the selected clothing image having a feature vector matching the feature vector of the image of the target clothing, to form at least one clothing collocation image group on the basis of the selected clothing image and the image of the target clothing, where the preset clothing information set includes clothing images and feature vectors of the clothing images.

In the present embodiment, in the apparatus 600 for presenting information: for the processing and the beneficial effects thereof of the receiving unit 601, the feature extraction unit 602, the selection unit 603 and the presentation unit 604, reference may be made to the relevant description of the implementations of step 201, step 202, and step 203 in the embodiment corresponding to FIG. 2, and detailed description thereof will be omitted.

In some alternative implementations of the present embodiment, the clothing information set includes attribute information of the clothing presented by the clothing images; and the selection unit 603 is further configured to: screen out, from the clothing information set, clothing images of clothing matching attribute information of the target clothing, wherein the attribute information includes at least one of: category information, style information, or texture information; and select, from the clothing images screened out, the clothing image having the feature vector matching the feature vector of the image of the target clothing.

In some alternative implementations of the present embodiment, the attribute information of the target clothing is obtained by performing attribute prediction on clothing presented by the image of the target clothing using a pre-trained attribute prediction model, wherein the attribute prediction model is obtained by training a convolutional neural network and at least one attention model based on training samples.

In some alternative implementations of the present embodiment, the selection unit 603 is further configured to: for a clothing image in the preset clothing information set, input a feature vector of the clothing image and the feature vector of the image of the target clothing into a pre-trained matching degree model, to obtain a matching degree value between the clothing image and the image of the target clothing; and select a preset number of matching degree values from a set of matching degree values obtained by the pre-trained matching degree model according to a descending order of the set of matching degree values, and selecting clothing images corresponding to the preset number of matching degree values from the preset clothing information set.

In some alternative implementations of the present embodiment, the matching degree model is obtained by training through: acquiring a training sample set, training samples in the training sample set including a random sample clothing image, a positive sample clothing image collocating with the random sample clothing image, and a negative sample clothing image not collocating with the random sample clothing image; and performing feature extraction on the sample clothing images using the convolutional neural network, to obtain feature vectors of the sample clothing images; for the training samples in the training sample set, performing following training operations: inputting a feature vector of the random sample clothing image, a feature vector of the positive sample clothing image, and a feature vector of the negative sample clothing image into a matching degree model to be trained, to obtain a feature value obtained after fully connecting the feature vector of the random sample clothing image, the feature vector of the positive sample clothing image, and the feature vector of the negative sample clothing image; determining whether a loss value of a preset loss function reaches a preset threshold, wherein the preset loss function is used to indicate a difference between a difference value and the feature value in a feature value set obtained by the matching degree model, the difference value being between an Euclidean distance between the feature vector of the random sample clothing image and the feature vector of the positive sample clothing image and an Euclidean distance between the feature vector of the random sample clothing image and the feature vector of the negative sample clothing image in the training samples; determining that the training on the matching degree model is completed in response to determining that the loss value of the preset loss function reaches the preset threshold; and adjusting a parameter of the matching degree model to continue performing the training operations, in response to determining that the loss value of the preset loss function does not reach the preset threshold.

In some alternative implementations of the present embodiment, the apparatus 600 further includes a presentation unit 604. The presentation unit 604 is configured to: input the formed at least one clothing collocation image group into a pre-trained score prediction model, to obtain a prediction score of each of the at least one clothing collocation image group, where the score prediction model is obtained by training a long short term memory network and a classifier based on training samples; and select a preset number of clothing collocation image groups according to a descending order of prediction scores, so that to present the selected clothing collocation image groups on a client end.

Figure 7:
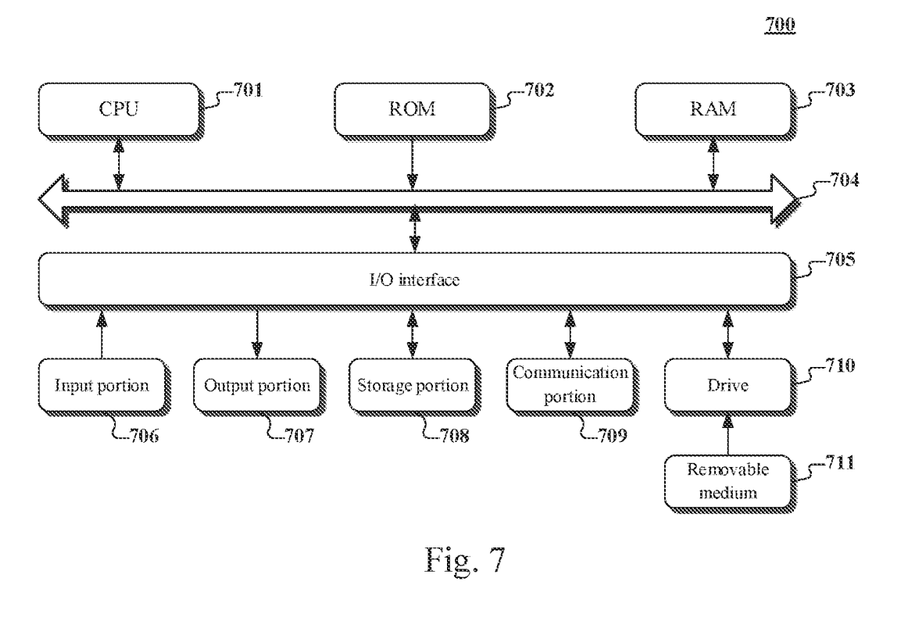
FIG. 7 is a schematic structural diagram of a computer system suitable for implementing a server according to an embodiment of the present disclosure.

With further reference to FIG. 7, FIG. 7 shows a schematic structural diagram of a computer system 700 suitable for implementing an electronic device (such as the server shown in FIG. 1) according to an embodiment of the present disclosure. The electronic device shown in FIG. 7 is only an example, and should not bring any limitation to the functions and scope of use of the embodiments of the present disclosure.

As shown in FIG. 7, the computer system 700 includes a central processing unit (CPU) 701, which may execute various appropriate actions and processes in accordance with a program stored in a read-only memory (ROM) 702 or a program loaded into a random access memory (RAM) 703 from a storage portion 708. The RAM 703 also stores various programs and data required by operations of the system X00. The CPU 701, the ROM 702 and the RAM 703 are connected to each other through a bus 704. An input/output (I/O) interface 705 is also connected to the bus 704.

The following components are connected to the I/O interface 705: an input portion 706 including a keyboard, a mouse etc.; an output portion 707 including a cathode ray tube (CRT), a liquid crystal display device (LCD), a speaker etc.; a storage portion 708 including a hard disk and the like; and a communication portion X09 including a network interface card, such as a LAN card and a modem. The communication portion 709 performs communication processes via a network, such as the Internet. A driver 710 is also connected to the I/O interface 705 as required. A removable medium 711, such as a magnetic disk, an optical disk, a magneto-optical disk, and a semiconductor memory, may be installed on the driver 710, to facilitate the retrieval of a computer program from the removable medium 711, and the installation thereof on the storage portion 708 as needed.

In particular, according to embodiments of the present disclosure, the process described above with reference to the flow chart may be implemented in a computer software program. For example, an embodiment of the present disclosure includes a computer program product, which includes a computer program that is hosted in a machine-readable medium. The computer program incudes program codes for executing the method as illustrated in the flow chart. In such an embodiment, the computer program may be downloaded and installed from a network via the communication portion 709, or may be installed from the removable medium 711. The computer program, when executed by the central processing unit (CPU) 701, implements the above mentioned functionalities as defined by the methods of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In some embodiments of the present disclosure, the computer readable storage medium may be any tangible medium containing or storing programs which can be used by a command execution system, apparatus or element or incorporated thereto. In some embodiments of the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

A computer program code for executing operations in some embodiments of the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in the embodiments of the present disclosure may be implemented by means of software or hardware. The described units or modules may also be provided in a processor, for example, described as: a processor, including a receiving unit, a feature extraction unit and a selection unit, where the names of these units or modules do not in some cases constitute a limitation to such units or modules themselves. For example, the receiving unit may also be described as "a unit for receiving a collocation request for performing clothing collocation on target clothing."

In another aspect, embodiments of the present disclosure further provide a computer-readable storage medium. The computer-readable storage medium may be the computer storage medium included in the apparatus in the above described embodiments, or a stand-alone computer-readable storage medium not assembled into the apparatus. The computer-readable storage medium stores one or more programs. The one or more programs, when executed by a device, cause the device to: receive a collocation request for performing clothing collocation on target clothing, the collocation request including an image of the target clothing; perform feature extraction on the image of the target clothing, to obtain a feature vector of the image of the target clothing; and select a clothing image from a preset clothing information set based on the feature vector of the image of the target clothing, the selected clothing image having a feature vector matching the feature vector of the image of the target clothing, to form at least one clothing collocation image group on the basis of the selected clothing image and the image of the target clothing, the preset clothing information set including clothing images and feature vectors of the clothing images.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for presenting information, the method comprising:
    receiving a collocation request for performing clothing collocation on target clothing, the collocation request comprising an image of the target clothing;
    performing feature extraction on the image of the target clothing, to obtain a feature vector of the image of the target clothing; and
    selecting a clothing image from a preset clothing information set based on the feature vector of the image of the target clothing, the selected clothing image having a feature vector matching the feature vector of the image of the target clothing, to form at least one clothing collocation image group on the basis of the selected clothing image and the image of the target clothing, the preset clothing information set comprising clothing images and feature vectors of the clothing images;
    wherein the selecting the clothing image from the preset clothing information set, the selected clothing image having a feature vector matching the feature vector of the image of the target clothing, comprises:
    for a clothing image in the preset clothing information set, inputting a feature vector of the clothing image and the feature vector of the image of the target clothing into a pre-trained matching degree model, to obtain a matching degree value between the clothing image and the image of the target clothing; and
    selecting a preset number of matching degree values from a set of matching degree values obtained by the pre-trained matching degree model according to a descending order of the set of matching degree values, and selecting clothing images corresponding to the preset number of matching degree values from the preset clothing information set.

2. The method according to claim 1, wherein the preset clothing information set comprises attribute information of clothing presented by the clothing images; and
    the selecting the clothing image from the preset clothing information set, the selected clothing image having a feature vector matching the feature vector of the image of the target clothing, comprises:
    screening out, from the clothing information set, clothing images of clothing matching attribute information of the target clothing, wherein the attribute information comprises at least one of: category information, style information, or texture information; and
    selecting, from the clothing images screened out, the clothing image having the feature vector matching the feature vector of the image of the target clothing.

3. The method according to claim 2, wherein the attribute information of the target clothing is obtained by performing attribute prediction on clothing presented by the image of the target clothing using a pre-trained attribute prediction model, wherein the attribute prediction model is obtained by training a convolutional neural network and at least one attention model based on training samples.

4. The method according to claim 1, wherein the matching degree model is obtained by training through:
    acquiring a training sample set, training samples in the training sample set comprising a random sample clothing image, a positive sample clothing image collocating with the random sample clothing image, and a negative sample clothing image not collocating with the random sample clothing image; and
    performing feature extraction on the sample clothing images using a convolutional neural network, to obtain feature vectors of the sample clothing images;
    for the training samples in the training sample set, performing the following training operations:
        inputting a feature vector of the random sample clothing image, a feature vector of the positive sample clothing image, and a feature vector of the negative sample clothing image into a matching degree model to be trained, to obtain a feature value after fully connecting the feature vector of the random sample clothing image, the feature vector of the positive sample clothing image, and the feature vector of the negative sample clothing image;
        determining whether a loss value of a preset loss function reaches a preset threshold, wherein the preset loss function is used to indicate a difference between a difference value and the feature value in a feature value set obtained by the matching degree model, the difference value being between an Euclidean distance between the feature vector of the random sample clothing image and the feature vector of the positive sample clothing image and an Euclidean distance between the feature vector of the random sample clothing image and the feature vector of the negative sample clothing image in the training samples;
        determining that the training on the matching degree model is completed, in response to determining that the loss value of the preset loss function reaches the preset threshold; and
        adjusting a parameter of the matching degree model to continue performing the training operations, in response to determining that the loss value of the preset loss function does not reach the preset threshold.

5. The method according to claim 1, wherein the method further comprises:
    inputting the formed at least one clothing collocation image group into a pre-trained score prediction model, to obtain a prediction score of each of the at least one clothing collocation image group, wherein the score prediction model is obtained by training a long short term memory network and a classifier based on training samples; and
    selecting a preset number of clothing collocation image groups according to a descending order of prediction scores, to present the selected clothing collocation image groups on a client end.

6. A system for presenting information, comprising a server end and a client end, the server end and the client end being in communication connection;
    the server end being configured to perform the method according to claim 1, the client end being configured to:
    send the collocation request to the server end; and
    present the at least one clothing collocation image group.

7. An apparatus for presenting information, the apparatus comprising:
at least one processor; and
a memory storing instructions, the instructions when executed by the at least one processor, cause the at least one processor to perform operations, the operations comprising:
receiving a collocation request for performing clothing collocation on target clothing, the collocation request comprising an image of the target clothing;
performing feature extraction on the image of the target clothing, to obtain a feature vector of the image of the target clothing; and
selecting a clothing image from a preset clothing information set based on the feature vector of the image of the target clothing, the selected clothing image having a feature vector matching the feature vector of the image of the target clothing, to form at least one clothing collocation image group on the basis of the selected clothing image and the image of the target clothing, the preset clothing information set comprising clothing images and feature vectors of the clothing images;
wherein the selecting the clothing image from the preset clothing information set, the selected clothing image having a feature vector matching the feature vector of the image of the target clothing, comprises:
for a clothing image in the preset clothing information set, inputting a feature vector of the clothing image and the feature vector of the image of the target clothing into a pre-trained matching degree model, to obtain a matching degree value between the clothing image and the image of the target clothing; and
selecting a preset number of matching degree values from a set of matching degree values obtained by the pre-trained matching degree model according to a descending order of the set of matching degree values, and selecting clothing images corresponding to the preset number of matching degree values from the preset clothing information set.

8. The apparatus according to claim 7, wherein the preset clothing information set comprises attribute information of clothing presented by the clothing images; and
the selecting the clothing image from the preset clothing information set, the selected clothing image having a feature vector matching the feature vector of the image of the target clothing, comprises:
screening out, from the clothing information set, clothing images of clothing matching attribute information of the target clothing, wherein the attribute information comprises at least one of: category information, style information, or texture information; and
selecting, from the clothing images screened out, the clothing image having the feature vector matching the feature vector of the image of the target clothing.

9. The apparatus according to claim 8, wherein the attribute information of the target clothing is obtained by performing attribute prediction on clothing presented by the image of the target clothing using a pre-trained attribute prediction model, wherein the attribute prediction model is obtained by training a convolutional neural network and at least one attention model based on training samples.

10. The apparatus according to claim 7, wherein the matching degree model is obtained by training through:
acquiring a training sample set, training samples in the training sample set comprising a random sample clothing image, a positive sample clothing image collocating with the random sample clothing image, and a negative sample clothing image not collocating with the random sample clothing image; and
performing feature extraction on the sample clothing images using a convolutional neural network, to obtain feature vectors of the sample clothing images;
for the training samples in the training sample set, performing the following training operations:
inputting a feature vector of the random sample clothing image, a feature vector of the positive sample clothing image, and a feature vector of the negative sample clothing image into a matching degree model to be trained, to obtain a feature value obtained after fully connecting the feature vector of the random sample clothing image, the feature vector of the positive sample clothing image, and the feature vector of the negative sample clothing image;
determining whether a loss value of a preset loss function reaches a preset threshold, wherein the preset loss function is used to indicate a difference between a difference value and the feature value in a feature value set obtained by the matching degree model, the difference value being between an Euclidean distance between the feature vector of the random sample clothing image and the feature vector of the positive sample clothing image and an Euclidean distance between the feature vector of the random sample clothing image and the feature vector of the negative sample clothing image in the training samples;
determining that the training on the matching degree model is completed in response to determining that the loss value of the preset loss function reaches the preset threshold; and
adjusting a parameter of the matching degree model to continue performing the training operations, in response to determining that the loss value of the preset loss function does not reach the preset threshold.

11. The apparatus according to claim 7, wherein the operations further comprise:
inputting the formed at least one clothing collocation image group into a pre-trained score prediction model, to obtain a prediction score of each of the at least one clothing collocation image group, wherein the score prediction model is obtained by training a long short term memory network and a classifier based on training samples; and
selecting a preset number of clothing collocation image groups according to a descending order of prediction scores, to present the selected clothing collocation image groups on a client end.

12. A non-transitory computer readable medium, storing a computer program thereon, the program, when executed by a processor, cause the processor to perform operations comprising:
receiving a collocation request for performing clothing collocation on target clothing, the collocation request comprising an image of the target clothing;
performing feature extraction on the image of the target clothing, to obtain a feature vector of the image of the target clothing; and
selecting a clothing image from a preset clothing information set based on the feature vector of the image of the target clothing, the selected clothing image having a feature vector matching the feature vector of the image of the target clothing, to form at least one clothing collocation image group on the basis of the selected clothing image and the image of the target clothing, the preset clothing information set comprising clothing images and feature vectors of the clothing images;

wherein the selecting the clothing image from the preset clothing information set, the selected clothing image having a feature vector matching the feature vector of the image of the target clothing, comprises:

for a clothing image in the preset clothing information set, inputting a feature vector of the clothing image and the feature vector of the image of the target clothing into a pre-trained matching degree model, to obtain a matching degree value between the clothing image and the image of the target clothing; and selecting a preset number of matching degree values from a set of matching degree values obtained by the pre-trained matching degree model according to a descending order of the set of matching degree values, and selecting clothing images corresponding to the preset number of matching degree values from the preset clothing information set.

13. The medium according to claim 12, wherein the preset clothing information set comprises attribute information of clothing presented by the clothing images; and the selecting the clothing image from the preset clothing information set, the selected clothing image having a feature vector matching the feature vector of the image of the target clothing, comprises:

screening out, from the clothing information set, clothing images of clothing matching attribute information of the target clothing, wherein the attribute information comprises at least one of: category information, style information, or texture information; and selecting, from the clothing images screened out, the clothing image having the feature vector matching the feature vector of the image of the target clothing.

14. The medium according to claim 13, wherein the attribute information of the target clothing is obtained by performing attribute prediction on clothing presented by the image of the target clothing using a pre-trained attribute prediction model, wherein the attribute prediction model is obtained by training a convolutional neural network and at least one attention model based on training samples.

15. The medium according to claim 12, wherein the matching degree model is obtained by training through:

acquiring a training sample set, training samples in the training sample set comprising a random sample clothing image, a positive sample clothing image collocating with the random sample clothing image, and a negative sample clothing image not collocating with the random sample clothing image; and performing feature extraction on the sample clothing images using a convolutional neural network, to obtain feature vectors of the sample clothing images;

for the training samples in the training sample set, performing the following training operations:

inputting a feature vector of the random sample clothing image, a feature vector of the positive sample clothing image, and a feature vector of the negative sample clothing image into a matching degree model to be trained, to obtain a feature value after fully connecting the feature vector of the random sample clothing image, the feature vector of the positive sample clothing image, and the feature vector of the negative sample clothing image;

determining whether a loss value of a preset loss function reaches a preset threshold, wherein the preset loss function is used to indicate a difference between a difference value and the feature value in a feature value set obtained by the matching degree model, the difference value being between an Euclidean distance between the feature vector of the random sample clothing image and the feature vector of the positive sample clothing image and an Euclidean distance between the feature vector of the random sample clothing image and the feature vector of the negative sample clothing image in the training samples;

determining that the training on the matching degree model is completed, in response to determining that the loss value of the preset loss function reaches the preset threshold; and adjusting a parameter of the matching degree model to continue performing the training operations, in response to determining that the loss value of the preset loss function does not reach the preset threshold.

16. The medium according to claim 12, wherein the operations further comprise:

inputting the formed at least one clothing collocation image group into a pre-trained score prediction model, to obtain a prediction score of each of the at least one clothing collocation image group, wherein the score prediction model is obtained by training a long short term memory network and a classifier based on training samples; and selecting a preset number of clothing collocation image groups according to a descending order of prediction scores, to present the selected clothing collocation image groups on a client end.

* * * * *